(12) United States Patent
Biermann et al.

(10) Patent No.: US 8,870,701 B2
(45) Date of Patent: Oct. 28, 2014

(54) DOUBLE DIFFERENTIAL DEVICE FOR A VEHICLE

(71) Applicant: Schaeffler Technologies AG & Co. KG, Herzogenaurach (DE)

(72) Inventors: Thorsten Biermann, Wachenroth (DE); Harald Martini, Herzogenaurach (DE); Richard Grabenbauer, Kastl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/847,507

(22) Filed: Mar. 20, 2013

(65) Prior Publication Data

US 2013/0252777 A1   Sep. 26, 2013

(30) Foreign Application Priority Data

Mar. 20, 2012   (DE) .......................... 10 2012 204 363

(51) Int. Cl.
   *F16H 48/05*   (2012.01)
(52) U.S. Cl.
   CPC ..................................... *F16H 48/05* (2013.01)
   USPC .......................................................... 475/221
(58) Field of Classification Search
   CPC ............. F16H 1/36; F16H 1/46; F16H 48/05; F16H 48/12
   USPC .................................. 475/221, 248, 249, 253
   See application file for complete search history.

(56) References Cited

U.S. PATENT DOCUMENTS

2003/0171184 A1*   9/2003   Wige .............................. 475/248

FOREIGN PATENT DOCUMENTS

| DE | 10315181 | 6/2006 |
|---|---|---|
| DE | 102009032286 | 6/2010 |
| WO | 2010003505 | 1/2010 |

\* cited by examiner

*Primary Examiner* — Robert A Siconolfi
*Assistant Examiner* — Huan Le
(74) *Attorney, Agent, or Firm* — Volpe and Koenig, P.C.

(57) ABSTRACT

A double differential device for a vehicle which is of compact construction. The device has a longitudinal differential section with a longitudinal differential input, a longitudinal differential output, an axle output. It also has a transverse differential section with a transverse differential input and two driven outputs. The longitudinal differential output is connected with the transverse differential input, the longitudinal differential section and the transverse differential section are each a planetary spur wheel gear and are arranged coaxially with a common main axis of rotation. The longitudinal differential section has a longitudinal differential planet carrier, which carries a longitudinal differential planet set, and the transverse differential section has a transverse differential planet carrier, which carries a first and a second transverse differential planet set. The longitudinal differential planet carrier and the transverse differential planet carrier are arranged rotatable relative to one another, and the two driven outputs are driven suns.

11 Claims, 8 Drawing Sheets

DOUBLE DIFFERENTIAL DEVICE FOR A VEHICLE

INCORPORATION BY REFERENCE

The following documents are incorporated herein by reference as if fully set forth: German Patent Application No.: 102012204363.2, filed Mar. 20, 2012.

BACKGROUND

The invention relates to a double differential device for a vehicle, having a longitudinal differential section, wherein the longitudinal differential section has a longitudinal differential input, a longitudinal differential output and an axle output, having a transverse differential section, wherein the transverse differential section has a transverse differential input and two driven outputs, wherein the longitudinal differential output is in operative connection with the transverse differential input, and wherein the longitudinal differential section and the transverse differential section are each designed as a planetary spur wheel gear and are arranged coaxially with a common main axis of rotation, wherein the longitudinal differential section has a longitudinal differential planet carrier, and the transverse differential section has a transverse differential planet carrier, and wherein the longitudinal differential planet carrier and the transverse differential planet carrier are arranged in such a way as to be rotatable relative to one another.

In the case of vehicles with all-wheel drive, a driving torque coming from an engine or from a transmission connected to the output of the engine is generally split several times. Thus, on the one hand, the driving torque is distributed between the two driven axles via an interaxle differential and, furthermore, is often distributed to the driven wheels on one axle via an axle differential. In this case, it is possible to design the interaxle differential and the two axle differentials as separate subassemblies.

Another approach is taken in publication WO 2010/003505 A2. In this publication, it is proposed to design both the interaxle differential and an axle differential as planetary spur wheel gears and to accommodate them as a coupled subassembly in a common housing. The drive assembly thereby formed for motor vehicles with all-wheel drive thus has one input and three outputs, wherein two outputs are assigned to the driven wheels on the front axle and the third output is assigned to the driven rear axle. The interaxle differential and the axle differential each have a planet carrier, these being coupled to one another for conjoint rotation.

Publication DE 103 15 181 A1, which probably forms the closest prior art, likewise describes a drive assembly for motor vehicles which is of functionally similar design to the abovementioned drive assembly. In contrast to the previous drive assembly, the spiders of the axle differential and of the interaxle differential in the embodiment in FIG. 2 of the present publication are designed to be rotatable relative to one another. To be more precise, an ring gear of the interaxle differential is connected for conjoint rotation to a spider of the axle differential, wherein the spider carries the planet wheels of the axle differential. The spider is surrounded on both sides by ring gears, wherein each of the ring gears meshes with one of the planet sets and is simultaneously connected for conjoint rotation to the driven shafts.

SUMMARY

It is the underlying object of the invention to provide a double differential device for a vehicle which is of compact construction.

This object is achieved by a double differential device having one or more features of the invention. Preferred or advantageous embodiments of the invention will be apparent from the following description, the claims, and the attached figures.

According to the invention, a double differential device is provided which is suitable and/or designed for a vehicle. In particular, the double differential device is used to distribute a driving torque in the vehicle. As a particularly preferred option, the vehicle is designed as an all-wheel-drive vehicle, specifically with a transverse engine. Together with the double differential device, the vehicle optionally forms a further subject of the invention.

The double differential device comprises a longitudinal differential section and a transverse differential section. The longitudinal differential section has the function of distributing a torque, in particular the driving torque of the engine or the driving torque converted by a transmission of the vehicle, to the two different driven axles of the vehicle. The transverse differential section has the function of distributing a torque to two drive shafts or wheels on a common axle.

For this purpose, the longitudinal differential section has a longitudinal differential input, a longitudinal differential output and an axle output. The transverse differential section, in contrast, has one transverse differential input and two driven outputs.

The longitudinal differential input forms an input member for the torque to be distributed in the vehicle. The axle output forms a first output member, which outputs some of the torque to one axle, in particular to a rear axle, or a Cardan drive. The two driven outputs of the transverse differential section form a second and third output member of the double differential device and each outputs some of the torque, in particular to drive shafts of wheels on a common axle, more specifically the front axle.

The longitudinal differential output outputs some of the torque to the transverse differential input and thus to the two driven outputs. The longitudinal differential section thus distributes the entire torque to the longitudinal differential output and the axle output, and the transverse differential section distributes that part of the longitudinal differential output to the two driven outputs.

To couple the longitudinal differential and transverse differential sections, provision is made for the longitudinal differential output to be in operative connection with the transverse differential input, with the result that some of the torque is transmitted from the longitudinal differential section to the transverse differential section.

Both the longitudinal differential section and the transverse differential section are designed as planetary spur wheel gears. The two planetary spur wheel gears are arranged coaxially with a common main axis of rotation. In particular, the common main axis of rotation is defined by an axis of rotation of the axle output and/or by the two driven outputs. In particular, the main axis of rotation is also defined by the axis of rotation of the longitudinal differential input and/or of the longitudinal differential output and/or of the transverse differential input.

The two planetary spur wheel gears are preferably arranged directly adjacent to one another. As a particularly preferred option, the two planetary spur wheel gears are arranged, in particular integrated, in a common housing.

As a planetary spur wheel gear, the longitudinal differential section comprises a longitudinal differential planet carrier, which carries a longitudinal differential planet set having a plurality of planets. In particular, the planets are rotatably mounted on the longitudinal differential planet carrier. As a planetary spur wheel gear, the transverse differential section comprises a transverse differential planet carrier, which has a first and a second transverse differential planet set, each of which comprises a plurality of planets rotatably mounted on the transverse differential planet carrier.

The longitudinal differential planet carrier and the transverse differential planet carrier are arranged in the double differential device in such a way as to be rotatable relative to one another. In particular, the double differential device can enter operating states in which the angular velocity of the longitudinal differential planet carrier differs from the angular velocity of the transverse differential planet carrier.

According to the invention, it is provided that the two driven outputs should be designed as driven suns.

The transverse differential section thus comprises the transverse differential planet carrier, which carries the first and second transverse differential planet sets, wherein the first transverse differential planet set meshes and/or is in gear tooth contact with a first of the two driven suns and the second transverse differential planet set meshes and/or is in gear tooth contact with a second of the two driven suns. As a supplementary measure, the planets of the two transverse differential planet sets mesh with one another in pairs, in particular in such a way that a symmetrical differential is formed. The advantage of this arrangement, especially in comparison with DE 103 15 181 A1, mentioned at the outset, may be regarded as the fact that the driven suns and the planets of the transverse differential planet sets are not arranged next to one another when viewed in the axial direction but are positioned in radial alignment. This modification of the arrangement leads to a considerable saving of installation space in the axial direction.

In a particularly preferred embodiment of the invention, the two driven suns have the same number of teeth but differ in terms of profile shift. In particular, one of the driven suns has a positive profile shift and the other of the driven suns has a negative profile shift. In terms of axial width, the planets of one transverse differential planet set extend across both sets of teeth of the driven suns but mesh only with the driven sun which has a positive profile shift. In contrast, the planets of the other planet set extend in the axial direction only across the teeth of the driven suns with a negative profile shift and mesh therewith. In particular, the transverse differential section is designed in light of the arrangement of the planets and suns described in publication DE 10 2009 032 286 A1, the relevant content of which is incorporated by reference as if fully set forth into the present application. This specific embodiment of the driven suns and of the planets allows a transverse differential section which is of very narrow construction in terms of axial width.

In a preferred embodiment of the invention, the longitudinal differential output is designed as a longitudinal differential ring gear, which meshes with the planets of the longitudinal differential planet set, and the transverse differential input is designed as the transverse differential planet carrier. The longitudinal differential ring gear and the transverse differential planet carrier are connected to one another for conjoint rotation. The joints can be a material joint or, alternatively, a joint which is positive in the direction of revolution around the main axis of rotation, for example. As a particularly preferred option, the longitudinal differential ring gear is designed in such a way that it overlaps or reaches over the transverse differential planet carrier in the axial direction, at least in sections, thus enabling the coupling to be made very narrow in respect of the axial width of the double differential arrangement.

In a preferred design embodiment of the invention, the transverse differential planet carrier has two carrier plates, between which the first and second transverse differential planet sets are arranged, wherein the longitudinal differential ring gear is designed as an annular component which is coupled for conjoint rotation to the planet carrier plate adjacent to the longitudinal differential planet carrier. In particular, the radial overlap of the longitudinal differential ring gear with the transverse differential planet carrier in the axial direction is limited to the narrow region of the adjacent carrier plate. This embodiment has the advantage that the longitudinal differential ring gear is very narrow in the axial direction and can therefore be produced as a lightweight and low-cost component.

In a preferred development of the invention, the longitudinal differential input is designed as a driving wheel coupled to the longitudinal differential planet carrier, and the axle output is designed as an output sun. In particular, the driving wheel has a toothing which runs around the double differential device. The torque is introduced into the double differential device via the driving wheel as a longitudinal differential input, is transmitted to the longitudinal differential planet carrier, is transferred from the latter to the longitudinal differential planet set, which transfers the torque to the output sun and the longitudinal differential ring gear as longitudinal differential outputs. As a particularly preferred option, the double differential arrangement is made so narrow in terms of axial width that the driving wheel or the toothing thereof reaches over the longitudinal differential ring gear and the transverse differential planet carrier in the axial direction.

This compact element is also made possible by the fact that the output sun and the longitudinal differential planet set are arranged so as to overlap in the radial direction.

In a preferred embodiment of the invention, the longitudinal differential planet set and the first and second transverse differential planet sets are arranged on different diameters around the main axis of rotation. Here, the diameters are defined by the axes of rotation of the planets of the various planet sets. The longitudinal differential planet set is assigned a first diameter, the first transverse differential planet set is assigned a second diameter and the second transverse differential planet set is assigned a third diameter in relation to the main axis of rotation. Provision is preferably made here for the first diameter not to be equal to the second diameter and/or for the first diameter not to be equal to the third diameter. It should be stressed particularly that the diameters of the planet sets can be chosen independently of one another since the supports of the planets of the planet sets are constructed independently of one another. In particular, double allocation of planet pins, leading to a lack of freedom in the selection of the diameters, is avoided. This enables the transmission ratios of the double-carrier differential device to be adapted freely to the respective vehicle, the invention thus allowing not only a narrow axial size but also particularly flexible adaptation.

In a particularly preferred development of the invention, the planets of the longitudinal differential planet set are arranged with support at the addendum circle in the longitudinal differential planet carrier. Support at the addendum circle is also referred to as centerless support. In this type of support, the planets are not supported by central pins, axles or shafts. Instead, the planets are surrounded positively, at least in sections, and are supported by their toothed outer sides on guide regions of the transverse differential planet carrier. This development has the advantage that, as seen in the axial direction, there is no need to provide installation space for the support or fixing of the pins etc. in the longitudinal differential planet carrier. There is also no need for measures such as carrier plates on both sides to support the pin etc. Instead, the planets rest in positive guide receptacles which are free radially toward the outside and toward the inside in order to transmit the torques and allow meshing contact with the longitudinal differential ring gear and the output sun. Support at the addendum circle is thus a further possible contribution to an axially narrow construction of the double differential device. It is particularly preferred that the longitudinal differential ring gear should be so narrow in the axial direction that it reaches over only the planets of the longitudinal differential planet set which are provided with support at the addendum circle and over the carrier plate, situated adjacent thereto, of the transverse differential planet carrier.

A further contribution to reducing the axial width can be achieved if the longitudinal differential planet carrier is designed as a side wall of the double differential device. The longitudinal differential planet carrier thus performs a dual function, namely, on the one hand, that of a functional element for torque transmission and, on the other hand, for closing off or for spatial, lateral limitation of the double differential device.

In this case, it is particularly preferred that the longitudinal differential planet carrier should also perform the function of the side wall, wherein, on the one hand, provision can be made for the transverse differential planet carrier to be supported via the axle output designed as an output sun on the longitudinal differential planet carrier designed as a side wall. This is achieved by axial bearings arranged between the components, for example. By virtue of this design configuration, the longitudinal differential planet carrier assumes a supporting function as a side wall for loads coming from the double differential device. As an alternative or in addition, bearing devices for supporting the double differential device are arranged in a surrounding structure on the longitudinal differential planet carrier designed as a side wall. Bearing devices of this kind are implemented as radial bearings, for example.

A housing of the double differential device is thus preferably formed by the longitudinal differential planet carrier as a side wall and by a further side wall on the opposite side, wherein the two side walls are connected radially on the outside to the driving wheel, in particular materially, and, radially on the inside, each have a bearing device for supporting the double differential device on the surrounding structure.

In a preferred embodiment of the invention, the longitudinal differential planet carrier is designed as a formed part. To implement the support at the addendum circle, the longitudinal differential planet carrier has a plurality of guide receptacles, each of which is designed to accommodate exactly one planet. The guide receptacles each preferably comprise a rear wall, in particular a flat rear wall, by means of which the positioned planet wheel ends with positive engagement in the axial direction and/or against which the positioned planet wheel rests freely and/or without being attached. The contact diameter of the rear walls preferably corresponds to the addendum circle diameter of the respectively positioned planets, enabling the latter to rest congruently on the rear wall. The guide receptacles each have at least one guide section, which is designed to provide lateral guidance for the at least one planet in the guide receptacles. The planets are guided positively in a radial direction with respect to the axes of rotation thereof by the at least one guide section. The guide sections preferably extend in the axial direction with respect to the main axis of rotation of the planetary gear and/or with respect to the axes of rotation of the planets, with the result that the guide sections surround the planets in the guide receptacles at least in sections in the direction of revolution. The planets are preferably surrounded in sections extending over an angular range of at least 30°, preferably at least 45°, and in particular at least 60°, around the axis of rotation of an inserted planet. In relation to the axis of rotation of a planet in the guide receptacle, the guide sections are, in particular, arranged in the radial end region of the rear wall of the same guide receptacle. By virtue of the axial and radial positive engagement with the rear wall and the at least one guide section, the planet wheel is held captive and, at the same time, rotatably in the guide receptacle. In the preferred embodiment, the in each case at least one guide section is produced by means of forming. Forming is a manufacturing process in which materials are given a different shape by plastic deformation through the selective application of forming forces. The advantage of this manufacturing process is the provision of a precise workpiece with low production tolerances. Particularly noteworthy are the short production times and good utilization of material in comparison with milling, for example. The guide section can be produced by bending, tension-pressure forming, in particular spinning or deep drawing, or shear forming, in particular displacement, for example. However, other forming processes, such as compressive forming, e.g. embossing, are also conceivable. All the guide sections of the planet carrier are preferably produced, in particular formed, in the same process step or synchronously.

In a preferred embodiment, the guide sections are designed as tabs that are bent over and, in axial plan view, extend as guide sections in the form of partial circles along the respective guide receptacle. In the region of contact with the at least one planet, the bent-over tabs have a hollow-cylindrical guide surface, which preferably corresponds approximately to the addendum circle diameter of the at least one planet wheel. The guide sections in the form of partial circles can be produced by bending tabs out of the same sheet metal plane as the rear wall of the guide receptacle, for example. In particular, the thickness of the material of the guide sections is the same as the thickness of the material of the rear wall. By virtue of the design in the form of partial circles, radial regions of the guide receptacle are free, allowing the planet wheels to mesh with the output sun and the longitudinal differential ring gear. The at least one guide section extends axially with respect to the axis of rotation and preferably ends flush with the axial width of the at least one positioned planet.

In one design embodiment, the planet carrier has a plurality of openings, these being arranged between the guide receptacles. Although the openings permit a reduction in the weight of the planet carrier, they also lead to a weakening of the planet carrier and can furthermore also result in fatigue to the material of the planet carrier owing to the mechanical loads. Provision is therefore preferably made to fill each of the openings with a reinforcing element, which reinforces the planet wheel carrier. To give a planet carrier designed with a sealing action, the reinforcing element can have the negative shape of the opening and is held positively, materially and/or non-positively in the planet carrier.

As a particularly preferred option, the reinforcing element is dimensioned in such a way that it is supported on the guide sections of the adjacent guide receptacles in order to support them and thereby improve dimensional stability of the guide receptacles under dynamic loading.

BRIEF DESCRIPTION OF THE DRAWINGS

Further features, advantages and effects of the invention will emerge from the following description of a preferred illustrative embodiment of the invention and from the attached figures, of which.

DETAILED DESCRIPTION OF THE PREFERRED EMBODIMENTS

Figure 1:
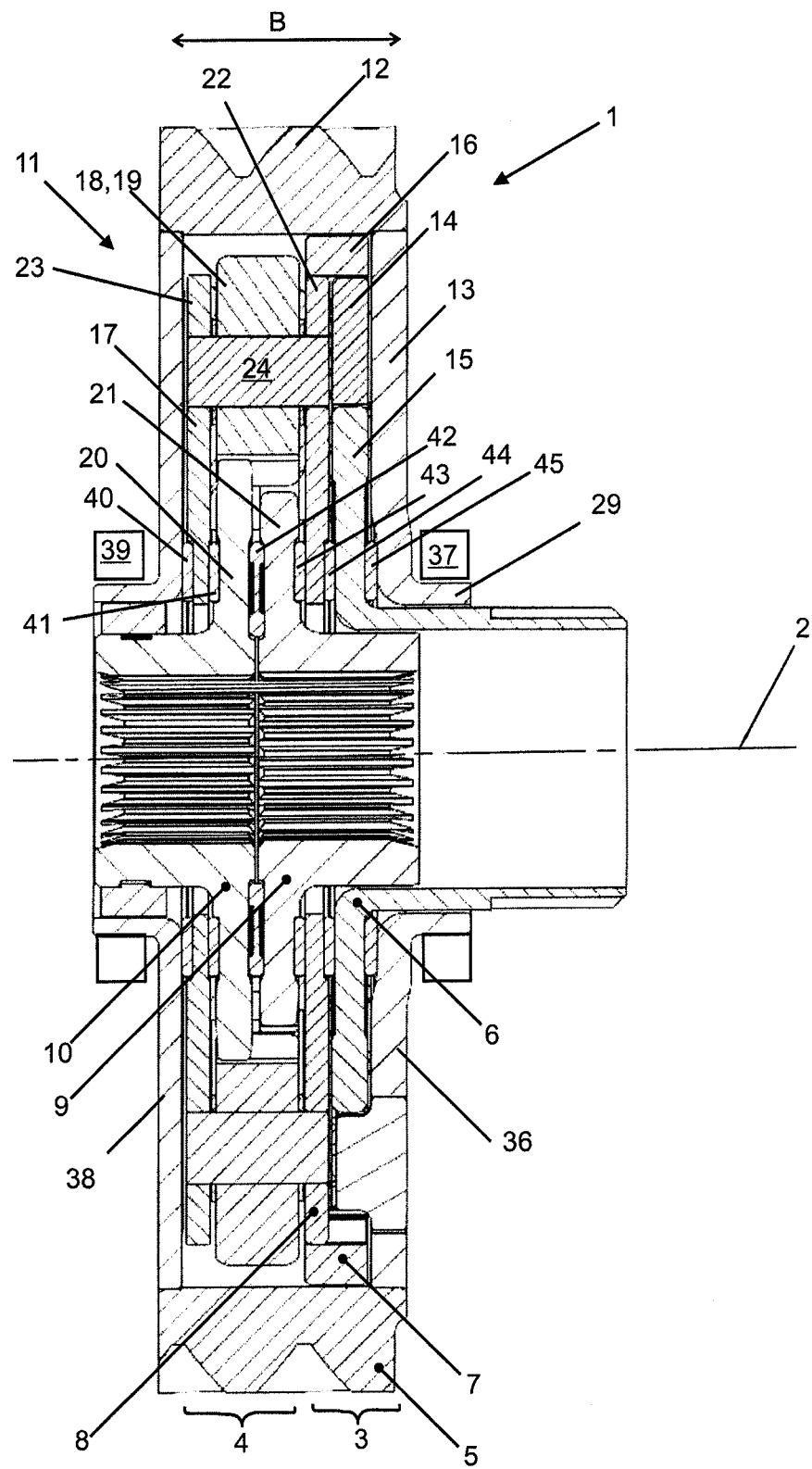
FIG. 1 shows a schematic longitudinal section through a double differential device as one illustrative embodiment of the invention.

In FIG. 1, a double differential device 1 is shown in a schematic longitudinal section through a main axis of rotation 2 of the double differential device 1 as one illustrative embodiment of the invention.

The double differential device 1 is designed as a center differential for a front transverse transmission on motor vehicles with an all-wheel-drive function, for example. Considered functionally, the double differential device 1 can be divided into a longitudinal differential section 3 and a transverse differential section 4. A torque from an engine is introduced via a longitudinal differential input 5. The torque is distributed to an axle output 6 and to a longitudinal differential output 7. The axle output 6 is coupled to a Cardan shaft or to some other torque transmission member, for example, and transmits some of the torque to a rear axle of the vehicle. The longitudinal differential output 7 is coupled to a transverse differential input 8 of the transverse differential section 4 and, via said input, transmits some of the torque to the transverse differential section 4. The transverse differential section 4 distributes the remaining torque to two driven outputs 9, 10. The driven outputs 9, 10 are coupled to drive shafts of wheels on a common axle, in particular the front axle of the vehicle. The longitudinal differential section 3 thus forms an interaxle differential, whereas the transverse differential section 4 forms an axle differential.

The longitudinal differential section 3 and the transverse differential section 4 are each designed as planetary spur wheel gears and are arranged in a common housing 11. As is also evident from FIGS. 6 and 7, the housing 11 is of disk-shaped design and, in the center, coaxially with the main axis of rotation 2, has a free passage region. The longitudinal differential section 3 and the transverse differential section 4 are structurally integrated in the housing 11, being directly adjacent to one another.

As the longitudinal differential input 5, the longitudinal differential section 3 has a driving wheel 12, which is coupled for conjoint rotation to a longitudinal differential planet carrier 13. The longitudinal differential planet carrier 13 supports a longitudinal differential planet set 14, which meshes, on the one hand, with the axle output 6, which is designed as an output sun 15. In addition, the longitudinal differential planet set 14 meshes with the longitudinal differential output 7, which is designed as a longitudinal differential ring gear 16.

The transverse differential section 4 has a transverse differential planet carrier 17, which is designed as a transverse differential input 8 and is coupled for conjoint rotation to the longitudinal differential ring gear 16. The transverse differential planet carrier 17 carries a first and a second transverse differential planet set 18, 19 (concealed), which mesh with driven outputs 9, 10 designed as driven suns 20, 21.

In terms of torque flow, the torque is introduced via the driving wheel 12 into the longitudinal differential section 3, is transmitted via the longitudinal differential planet carrier 13 to the longitudinal differential planet set 14, which distributes the torque to the output sun 15 and the longitudinal differential ring gear 16. From there, the torque is transmitted to the transverse differential planet carrier 17, which distributes the remaining torque to the two transverse differential planet sets 18, 19, which transmit the distributed torque to the driven suns 20, 21.

The transverse differential planet carrier 17 has two carrier plates 22, 23, which extend in a radial plane with respect to the main axis of rotation 2 and which are connected to one another by pins 24. The transverse differential planet sets 18, 19 and the driven suns 20, 21 are arranged between the carrier plates 22, 23. As seen in the radial direction with respect to the main axis of rotation 2, the transverse differential planet sets 18, 19 are in alignment with the driven suns 20, 21, and therefore the axial width B of the transverse differential planet carrier 17 is very narrow.

Figure 2:
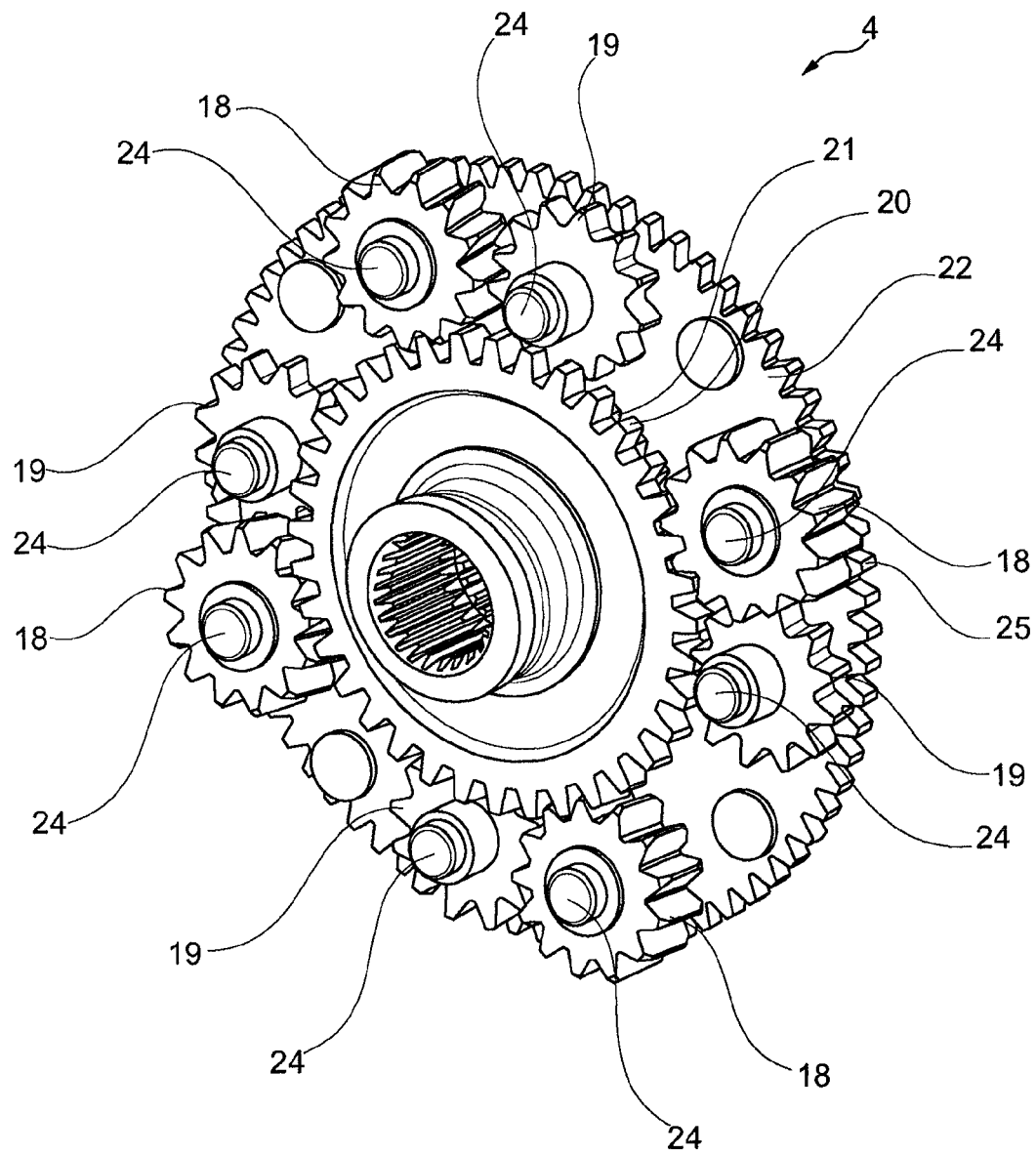
FIG. 2 shows a partial subassembly of a transverse differential section in the double differential device of FIG. 1 in a schematic three-dimensional view.

FIG. 2 shows a three-dimensional view of a partial subassembly of the transverse differential section 4, wherein the carrier plate 22 adjoining the longitudinal differential section 3, with the pins 24 and the first and second transverse differential planet sets 18, 19, and the driven suns 20, 21 are shown. The base plate of carrier plate 22 is designed as a circular metal disk, which, on the encircling face, has a toothing 25, in particular splines or positive-lock toothing. The pins 24 are divided into four groups, one planet of the first transverse differential planet set 18 and one planet of the second transverse differential planet set 19 being arranged in each group, meshing with one another, and hence in pairs, in each group. The two driven suns 20, 21 have the same number of teeth, although the driven sun 21 adjacent to the longitudinal differential section 3 has a negative profile shift in the teeth and the other driven sun 20 has a positive profile shift in the teeth, with the result that the addendum circle diameters thereof are different. The planets of the first transverse differential planet set 18 extend in the direction of the axial width B across both driven suns 20, 21 but mesh only with driven sun 20 and additionally with one planet of the second transverse differential planet set 19. The planets of the second transverse differential planet set 19 are embodied so as to be narrower in terms of axial width B and arranged in such a way that they mesh with driven sun 21 but do not make contact with driven sun 20.

Figure 3:
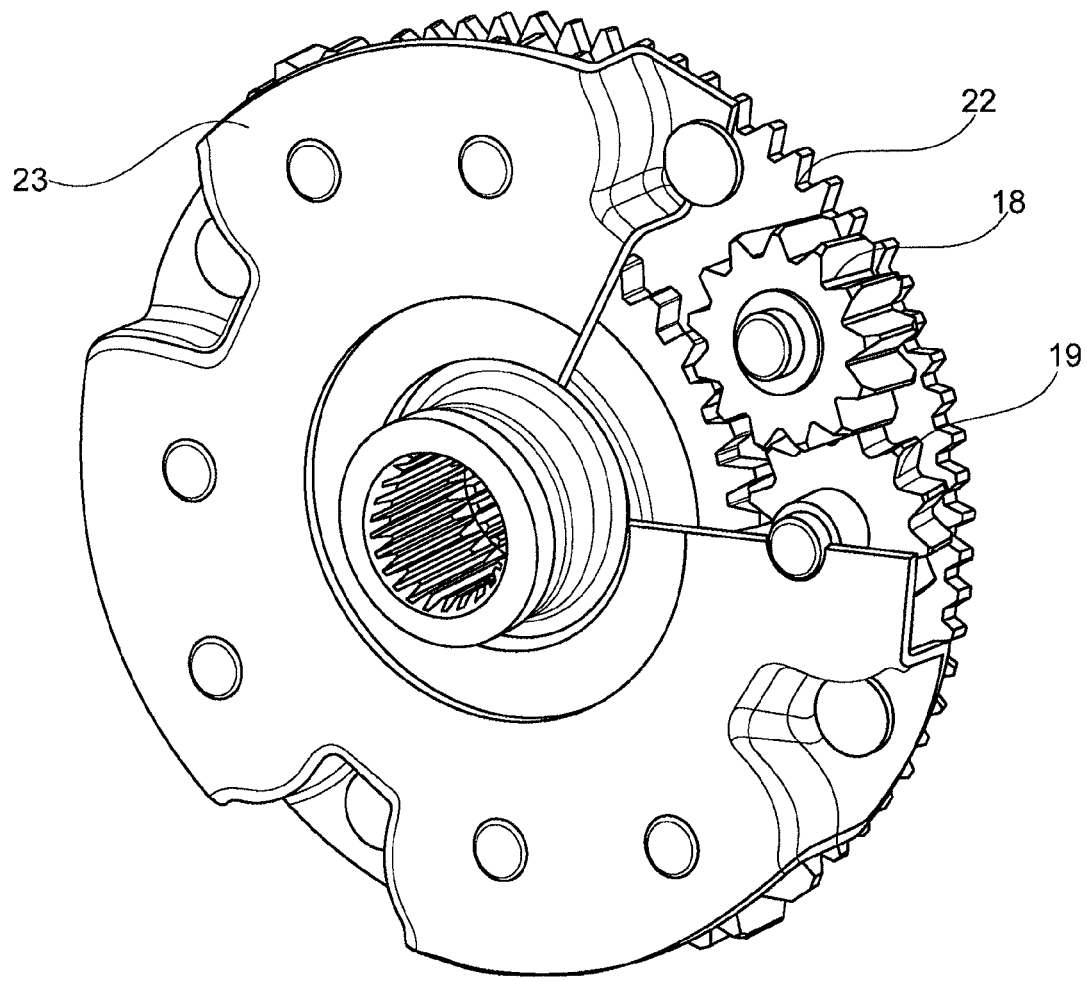
FIG. 3 shows the transverse differential section with further components illustrated in the same way as in FIG. 2.

FIG. 3 shows the transverse differential section 4 illustrated in the same way, it being possible to see that the second carrier plate 23 is designed as a contoured formed sheet metal part which has locating regions for the planets of the transverse differential planet sets 18, 19 and has recesses by which carrier plate 23 can be mechanically and rigidly connected to carrier plate 22.

By virtue of the arrangement of the planets of the transverse differential planet sets 18, 19 within the same axial installation space as the driven suns 20, 21, it is possible to keep the axial width B of the transverse differential section 4 and hence also of the double differential device 1 narrow.

Figure 4:
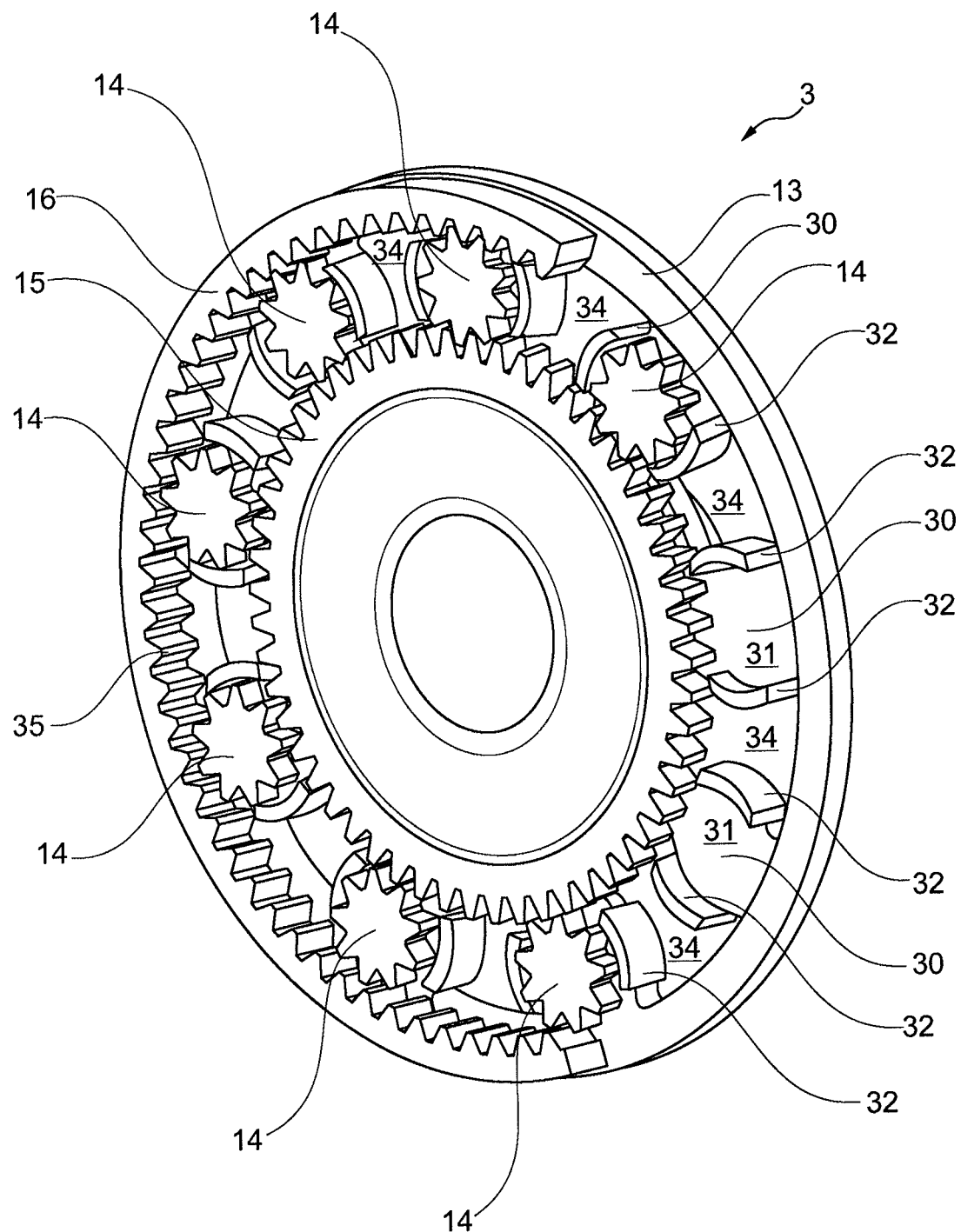
FIG. 4 shows a partially sectioned view of a partial subassembly of a longitudinal differential section of FIG. 1 illustrated in the same way as in FIGS. 2 and 3.

FIG. 4 shows a partial subassembly of the longitudinal differential section 3, namely the longitudinal differential planet carrier 13, the planets of the longitudinal differential planet set 14, the longitudinal differential ring gear 16 and the output sun 15. The components are partially sectioned or, in some cases, omitted from the drawing. It is evident from the illustration that the planets of the longitudinal differential planet set 14 are arranged so as to be supported at the addendum circle—or in a centerless manner—in the longitudinal differential planet carrier 13. The planets of the longitudinal differential planet set 14 are distributed uniformly and/or equidistantly in the direction of revolution. To accommodate the planets, the longitudinal differential planet carrier 13 has guide receptacles 30, with each guide receptacle carrying one planet. The guide receptacles 30 have a continuous flat rear wall 31, on which the planets rest in surface contact, and two guide sections 32 extending in the axial direction, which, in a contact region with the planets, have a guide surface for the planets which is curved in a circular manner in axial plan view. Each guide receptacle 30 has two guide sections 32, which guide the planets in the direction of revolution. In contrast, regions of the guide receptacle 30 which face radially outward and inward are free, allowing the planets to mesh with the output sun 15 and the longitudinal differential ring gear 16. In particular, the guide sections 32 extend over an angular range of between 50 and 90 degrees around an axis of rotation of the planets in the guide receptacle 30, are aligned in the direction of revolution and each surround the planets in the manner of brackets.

The longitudinal differential planet carrier 13 is designed as a formed part. The outer contour and stamped contours for the preparation of the guide receptacles 30 are stamped out of a flat portion of sheet metal. In a subsequent step, the stamped contours are formed, giving rise to the guide sections 32, which are designed as collars or cheeks. In plan view, the guide sections 32 are thus designed as collars or curved webs projecting perpendicularly to the longitudinal differential carrier plate 13. The design of the guide receptacle 30 allows the planets of the longitudinal differential planet set 14 to be moved in the direction of revolution by the longitudinal differential planet carrier 13 in order to transmit the torque from the longitudinal differential planet carrier 13 to the longitudinal differential planet set 14. There are openings 34 arranged between the guide sections 32. The openings 34 form fluidic connections between the guide receptacles 30 and, for example, a rear side of the longitudinal differential planet carrier 13. The interior of the double differential device 1 or the housing 11 thereof is thus connected to the surroundings of the double differential device 1 by the openings 30 and, if appropriate, by other apertures. This prevents the formation of hydrodynamic resistances between the planets of the longitudinal differential planet set 14 and the longitudinal differential planet carrier 13 during operation, which would lead to an unwanted blocking action of the longitudinal differential section 3. The axle output 6 is formed integrally as a formed part with the output sun 15.

Figure 5:
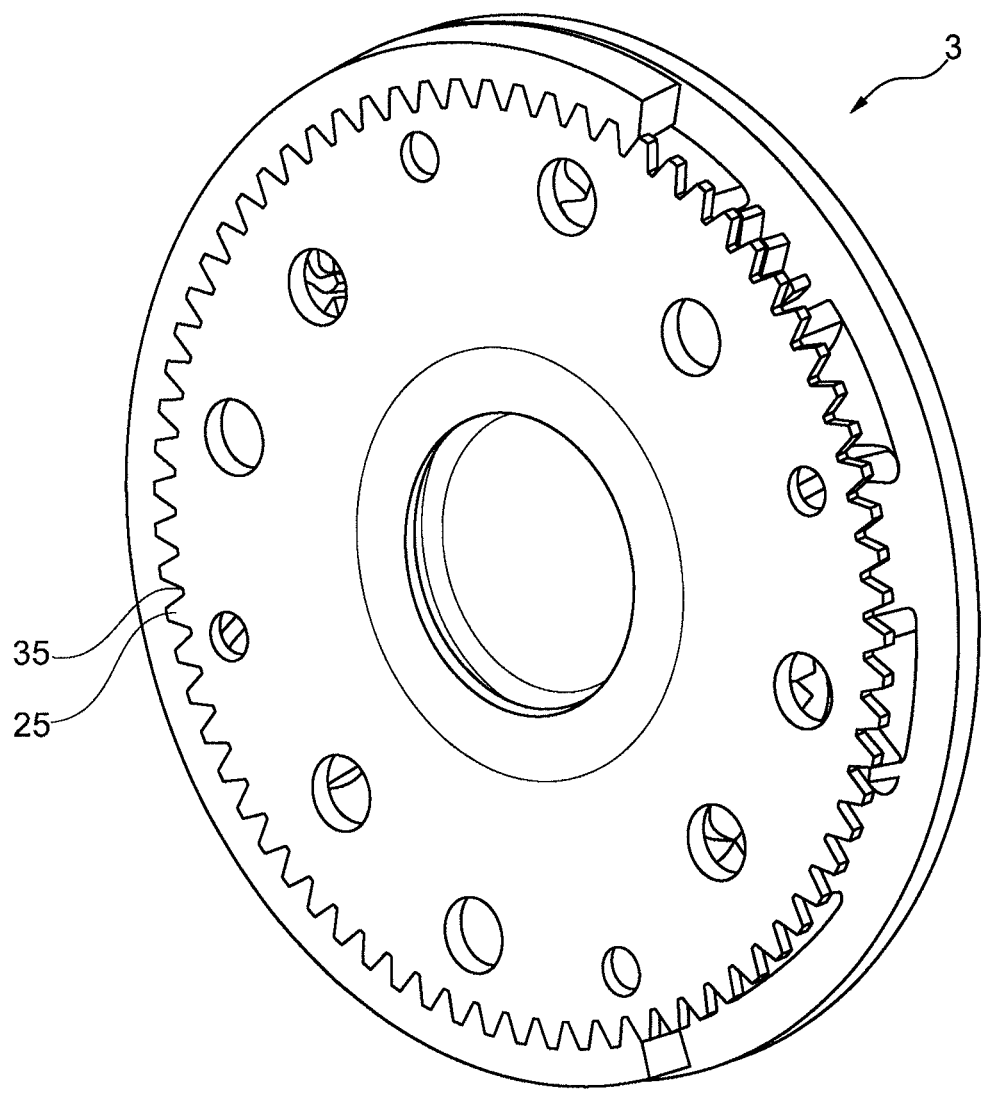
FIG. 5 shows the transition between the longitudinal differential section and the transverse differential section illustrated in the same way as in FIG. 4.

The outside diameter of the longitudinal differential ring gear 16 is made smaller than that of the longitudinal differential planet carrier 13, thus allowing the latter to rotate without friction under or in the driving wheel 12. The longitudinal differential ring gear 16 has internal toothing 35 which extends in the axial direction and by means of which the longitudinal differential ring gear 16 meshes with the planets of the longitudinal differential planet set 14. At the same time, the internal toothing 35 forms a positive-engagement partner with the toothing 25 of carrier plate 22, internal toothing 35 and toothing 25 together forming a rotationally locked spline system, as is clearly evident in FIG. 5, which shows the subassembly from FIG. 4 with carrier plate 22 inserted.

It is emphasized that internal toothing 35 which is continuous in the axial direction is used to provide meshing with the planets of the longitudinal differential planet set 14 and interlocking with the toothing 25, this internal toothing being simple and economical to produce in terms of manufacturing technology. Due to the short axial width of the tip support for the planets of the longitudinal differential planet set 14, the longitudinal differential section 3 is also of very narrow construction in terms of axial width B. In particular, the longitudinal differential ring gear 16 is made very narrow in terms of axial width B since it extends only over the axial region of the carrier plate 22 and of the planets of the longitudinal differential planet set 14.

Figure 6:
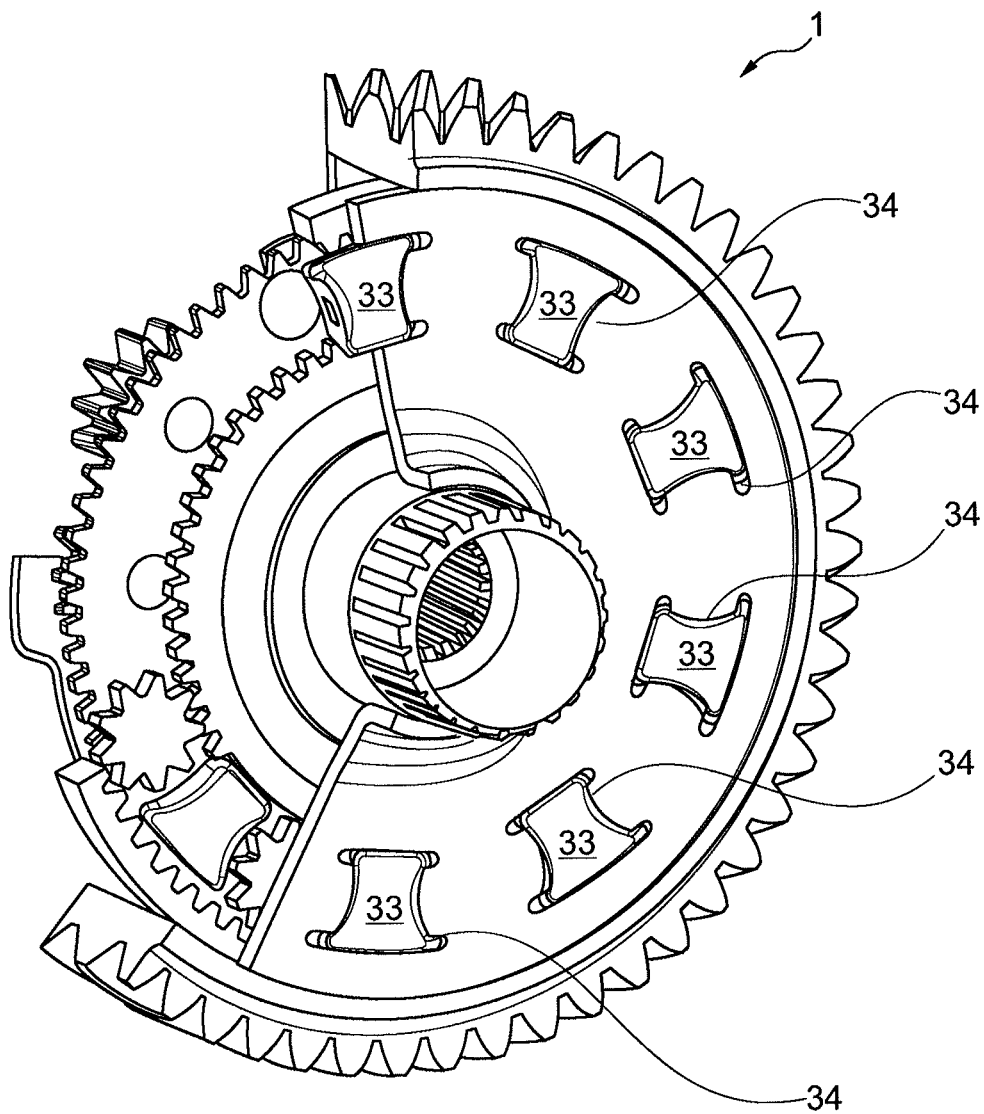
FIG. 6 shows a schematic three-dimensional and partially sectioned view of the double differential device 1 in FIG. 1 from the side of the longitudinal differential section.

In FIG. 6, the double differential device 1 is shown partially sectioned in a three-dimensional view, and it can be seen that reinforcing elements 33 are inserted in the openings 34, supporting the longitudinal differential planet wheel 13 in the direction of revolution. In particular, the reinforcing elements 33 support the guide sections 32 arranged next to an opening 34 and designed as collars against loads in the direction of revolution. Since the entire torque introduced is transmitted to the longitudinal differential planet set 14 via the longitudinal differential planet carrier 13, and the openings 34 could reduce the stiffness of the longitudinal differential planet carrier 13, the optional reinforcing elements 33 can be used to increase the structural rigidity of this component.

Figure 7:
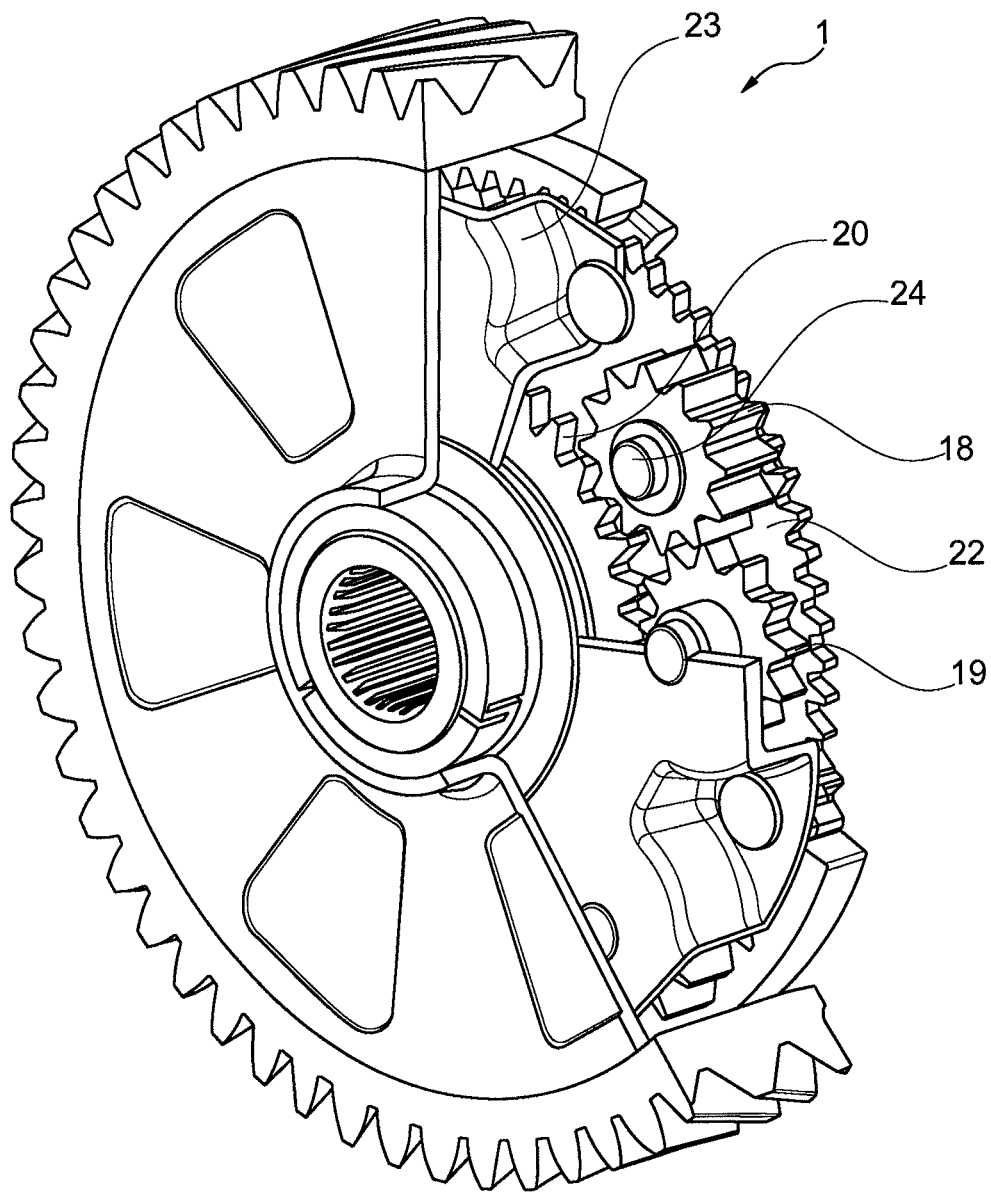
FIG. 7 shows the double differential device from the other side, illustrated in the same way as in FIG. 6.

FIG. 7 shows the double differential device 1 in a three-dimensional view from the other side.

As is once again evident especially from FIG. 1, the longitudinal differential planet carrier 13 assumes a multiple function. In addition to its supporting and guiding function for the planets of the longitudinal differential planet set 14, it additionally forms a side wall 36 for the housing 11. In this capacity, the longitudinal differential planet carrier 13 is fixed to the driving wheel 12, in particular materially and, optionally, is closed off flush in the axial direction in addition. A bearing device 37 is mounted in the radially inner region on a projecting collar section 29, said bearing device supporting the double differential device 1 in the radial direction relative to a stationary surrounding structure, allowing the housing 11 to rotate relative to the surrounding structure. The collar section 29 is produced by a forming process. Arranged on the opposite side of the double differential device 1 is another side wall 38, which carries a bearing device 39 in the same way. The driving wheel 12, the longitudinal differential planet carrier 13 and the additional side wall form the housing 11 into which the longitudinal differential section 3 and the transverse differential section 4 are integrated.

In the sectional drawing, it can furthermore be seen that a first axial bearing device 40 is arranged between side wall 38 and carrier plate 23, a second axial bearing device 41 is arranged between carrier plate 23 and driven sun 20, a third axial bearing device 42 is arranged between driven sun 20 and driven sun 21, a fourth axial bearing device 43 is arranged between driven sun 21 and carrier plate 22, a fifth axial bearing device 44 is arranged between carrier plate 22 and the output sun 15, and a sixth axial bearing device 45 is arranged between the output sun 15 and the longitudinal differential planet carrier 13, which is designed as a side wall 36.

Figure 8:
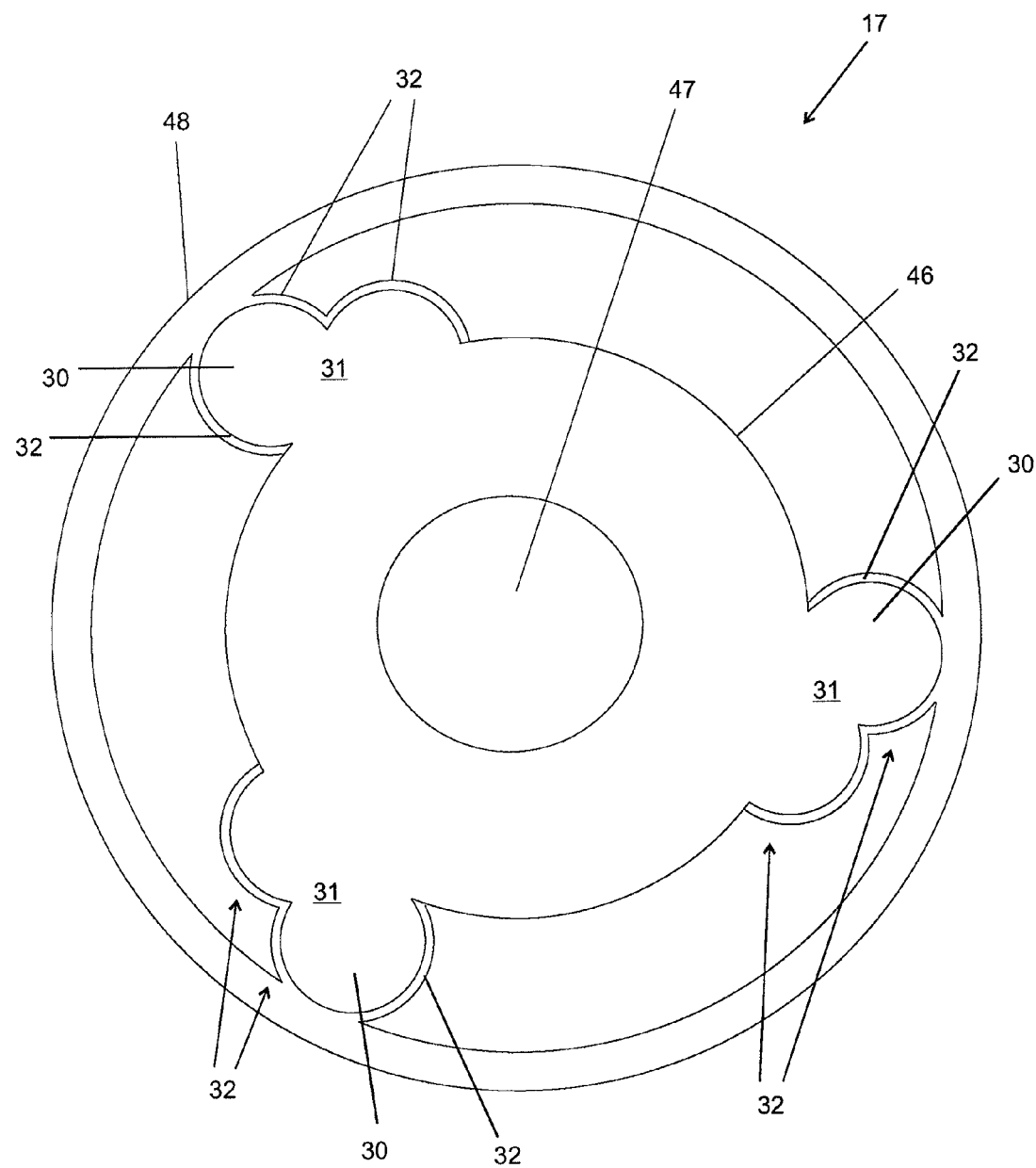
FIG. 8 shows a schematic plan view of a modified version of the transverse differential planet carrier of FIG. 1 for a transverse differential section.

FIG. 8 shows a modified version of the transverse differential planet carrier 17 from FIG. 1, which, like the longitudinal differential planet carrier 3, is designed as a formed planet carrier, and therefore attention is drawn to the preceding description. In this illustrative embodiment, the transverse differential planet carrier 17 does not have any pins 24 since the planets of the transverse differential planet sets 18, 19 are supported at the addendum circle. For support at the addendum circle, the transverse differential planet carrier 17 has the continuous flat rear wall 31, on which the planets rest in surface contact, in each guide receptacle 30. In the outer region of the rear wall 31 there are the guide sections 32 in the form of partial circles extending in the axial direction in certain sections. Each guide receptacle 30 comprises two guide sections 32, guiding the meshing planets of the transverse differential planet sets 18, 19 in the direction of revolution. Since there is no ring gear in the transverse differential section 4, the guide sections 32 extend continuously on the radial outer side of the transverse differential planet carrier 17. In this case, the diameter of the guide sections 32 corresponds at least to the addendum circle diameter of the planets of the transverse differential planet sets 18, 19, with the result that the guidance for the planets is close but allows free movement. In the radially lower region, in contrast, the guide section 32 ends with the addendum circle diameter 46 of driven sun 20, with the result that the planets can mesh with one another and with the associated driven suns 20, 21. The guide sections 32 extend over the entire axial width of both planets, and therefore the guide section 32 ends flush with the planets of the transverse differential planet set 18.

In the center, the transverse differential planet carrier 17 has a circular aperture 47, which is provided for the purpose of passing through the outputs of driven sun 21. Moreover, the transverse differential planet carrier 17 optionally has, in the edge region, an edge section 48 which is aligned axially and preferably has the same axial width as the guide sections 32.

Like the longitudinal differential carrier 13 from FIG. 4, the transverse differential carrier 17 with the guide sections 32 and the edge section 48 is also produced by means of a forming process. In this case, provision is preferably made for the guide sections 32 and, if appropriate, the edge section 48 to be formed in the same process step.

LIST OF REFERENCE SIGNS 1 double differential device
2 main axis of rotation
3 longitudinal differential section
4 transverse differential section
5 longitudinal differential input
6 axle output
7 longitudinal differential output
8 transverse differential input
9 driven output
10 driven output
11 housing
12 driving wheel
13 longitudinal differential planet carrier
14 longitudinal differential planet set
15 output sun
16 longitudinal differential ring gear
17 transverse differential planet carrier
18 transverse differential planet set
19 transverse differential planet set
20 driven sun
21 driven sun
22 carrier plate
23 carrier plate
24 pin
25 toothing
26 unused
27 unused
28 unused
29 collar section
30 guide receptacles
31 rear wall
32 guide sections
33 reinforcing elements
34 openings
35 internal toothing
36 side wall
37 bearing device
38 side wall
39 bearing device
40 bearing device
41 bearing device
42 bearing device
43 bearing device
44 bearing device
45 bearing device
46 addendum circle diameter of driven sun 20
47 aperture
48 edge section

The invention claimed is:

1. A double differential device for a vehicle, comprising:
a longitudinal differential section for distributing torque to two different axles of the vehicle, the longitudinal differential section including a longitudinal differential input, a longitudinal differential output, and an axle output;
a transverse differential section for distributing torque to two drive shafts or wheels on a common one of the axles of the vehicle, the transverse differential section including one transverse differential input and two driven outputs;
the longitudinal differential output is in operative driving connection with the transverse differential input;
the longitudinal differential section and the transverse differential section are each a planetary spur wheel gear and are arranged coaxially with a common main axis of rotation, the longitudinal differential section has a longitudinal differential planet carrier, which carries a longitudinal differential planet set, and the transverse differential section has a transverse differential planet carrier, which carries a first and a second transverse differential planet set, the longitudinal differential planet carrier and the transverse differential planet carrier are arranged rotatable relative to one another; and
the two driven outputs comprise driven suns.

2. The double differential device as claimed in claim 1, wherein the longitudinal differential input comprises a driving wheel coupled to the longitudinal differential planet carrier, and the axle output comprises an output sun.

3. The double differential device as claimed in claim 1, wherein the longitudinal differential planet set is arranged radially from the common main axis of rotation on a circle with a first diameter and the first transverse differential planet set is arranged radially from the common main axis of rotation at a second diameter, and the second transverse differential planet set is arranged radially from the common main axis of rotation at a third diameter, at least one of the first diameter is not equal to the second diameter or the first diameter is not equal to the third diameter.

4. The double differential device as claimed in claim 1, wherein planets of the longitudinal differential planet set are arranged with support at an addendum circle in the longitudinal differential planet carrier.

5. The double differential device as claimed in claim 1, wherein the longitudinal differential planet carrier comprises a formed part.

6. The double differential device as claimed in claim 1, wherein the longitudinal differential output is a longitudinal differential ring gear, and the transverse differential input is the transverse differential planet carrier, and the transverse differential planet carrier is rigidly connected to the longitudinal differential ring gear.

7. The double differential device as claimed in claim 6, wherein the transverse differential planet carrier has two carrier plates, between which the first and second transverse differential planet sets are arranged.

8. The double differential device as claimed in claim 7, wherein the longitudinal differential ring gear is an annular component which is coupled for conjoint rotation to the one of the carrier plate that is adjacent to the longitudinal differential planet carrier.

9. The double differential device as claimed in claim 1, wherein the longitudinal differential planet carrier comprises a side wall of the double differential device.

10. The double differential device as claimed in claim 9, wherein the transverse differential planet carrier is supported via the axle output provided as the output sun on the longitudinal differential planet carrier that comprises the side wall.

11. The double differential device as claimed in claim 9, wherein bearing devices for supporting the double differential device are arranged in a surrounding structure on the longitudinal differential planet carrier that comprises the side wall.

* * * * *